United States Patent Office 3,212,233
Patented Oct. 19, 1965

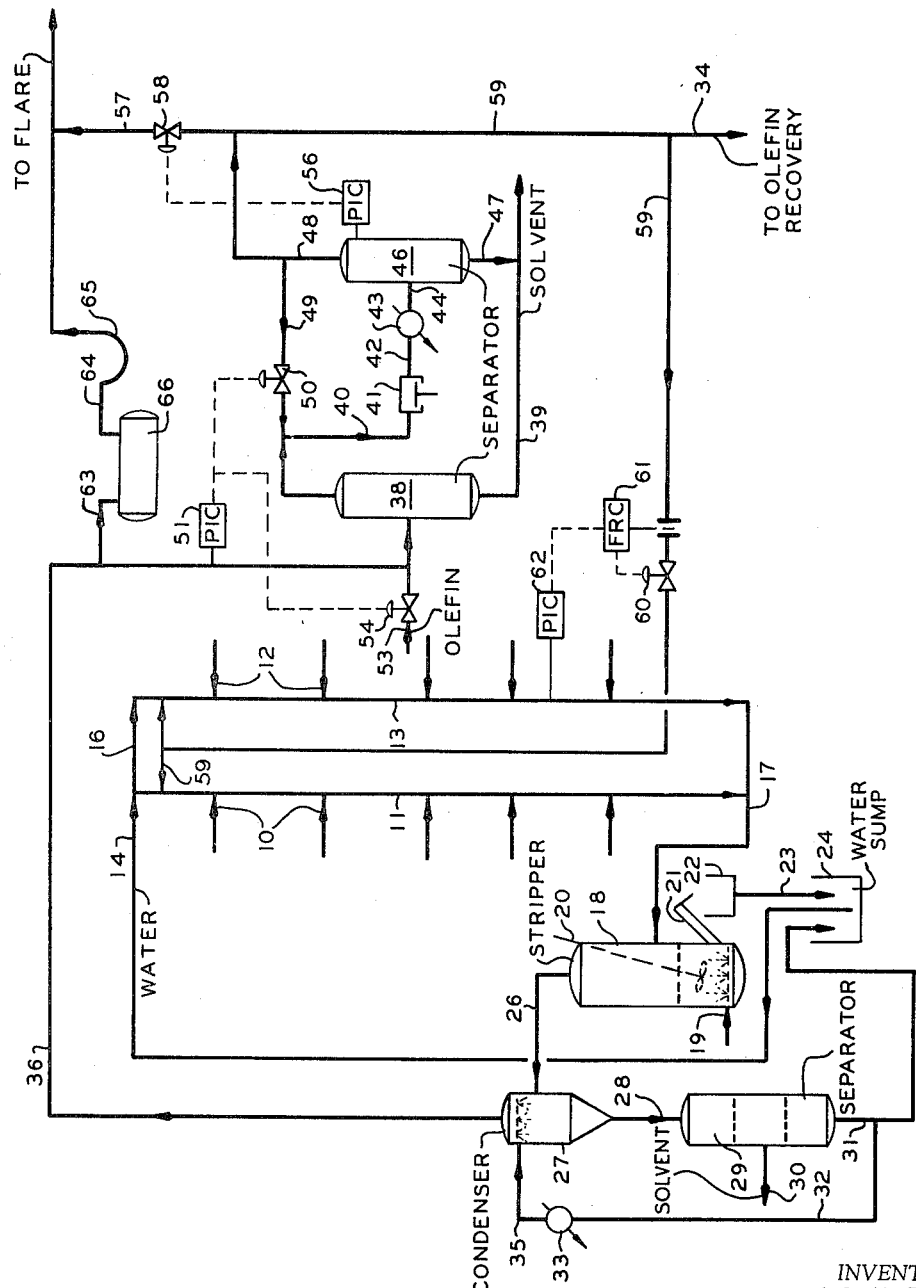

3,212,233
SOLIDS, LIQUID AND VAPOR RECOVERY
SYSTEM AND METHOD
John S. Hubby, Pasadena, Tex., assignor to Phillips
Petroleum Company, a corporation of Delaware
Filed Aug. 7, 1963, Ser. No. 300,501
17 Claims. (Cl. 55—23)

This invention relates to a system for the recovery of solids, liquid and vaporous constituents. In another aspect, this invention relates to a system for the recovery of valuable solids, liquid and vaporous constitutents in gases normally sent to a flare line or otherwise wasted.

In the separation and processing of hydrocarbons by refineries, gasoline plants, petrochemical plants and the like, large quantities of gases are sent to a flare as a result of upset conditions in portions of the plant or due to leakage of high pressure gases through safety valves into the flare line system. These gases contain valuable solids, liquids and vapors. It is desirable that these solids, liquids and vapors be recovered and returned to the process.

Accordingly, an object of my invention is to provide a process and apparatus for the separation and recovery of solids, liquids and vapors.

Another object of my invention is to provide a process and apparatus for the separation and recovery of solids, liquids and vapors from normally waste streams.

Another object of my invention is to provide for the separation and recovery of solids, liquids and vapors from a flare system.

Other objects, advantages and features of my invention will be readily apparent to those skilled in the art from the following description, the drawing, and the appended claims.

Broadly, I have provided a separation and recovery process and apparatus which comprises passing solids, liquid and vapor to a contact zone, passing a mixture of said liquid, solids and vapor from said contact zone to a first separation zone, withdrawing said solids from said first separation zone, withdrawing said liquid from said first separation zone, passing a vapor from said first separation zone to a second separation zone, withdrawing a liquid from said second separation zone, withdrawing a vapor from said second separation zone, and recycling at least a portion of said vapor withdrawn from said second separation zone to said contact zone. The process is particularly applicable to the separation of solids, liquids and vapors from normally waste process streams.

The drawing is a schematic representation of one embodiment of the inventive process.

The invention will hereinafter be described as applied to the separation of solid polymer, hydrocarbon solvent and olefin from normally waste process streams although it is not intended that the invention should be limited thereto.

In the polymerization of low molecular 1-olefins such as ethylene and propylene to produce solid polymers, the 1-olefins are polymerized in the presence of a solvent such as cyclohexane. Large quantities of gases containing solid polymer, cyclohexane and olefins are passed to a flare as a result of upset conditions in the plant or by leakage, such as the leakage of high pressure gases through safety valves int othe flare line system.

Referring to the drawing, the invention will be described as it is applied to the recovery of solid polymer, a solvent such as cyclohexane, and normally vaporous olefins from a process flare system. Solvent and solid polymer is passed from a polymerization process via conduit means 10 to a polymerization reactor area relief header 11. Solvent and olefin is passed via conduit means 12 from a solvent recovery process to a solvent removal area relief header 13. Water is passed to conduits 11 and 13 via conduit means 14 and 16, respectively. The water is passed through conduits 11 and 13, flushing the solid polymer and liquid from relief headers 11 and 13 and into conduit 17 and to stripper 18.

Within stripper 18, the feed mixture comprising water, solvent, polymer solids and vaporous olefins is contacted with stripping steam passed to stripper 18 via conduit and dispersing means 19. Intimate contact between the stripping steam and the feed mixture is maintained by agitation means 20. Typically, stripper 18 can be operated at a temperature of 185° F. and a pressure of 0.5 p.s.i.g. Solid polymer is withdrawn from stripper 18 via a polymer dump chute 21 and passed to a polymer container 22. Water withdrawn from stripper 18 with the polymer is passed from container 22 via conduit means 23 to a water sump 24.

A vapor stream comprising steam, olefins and solvent is withdrawn from stripper 18 via conduit means 26 and passed to a means for condensing the said solvent and steam, such as a condenser 27. Within condenser 27 the vaporous stream is contacted with water passed to condenser 27 via conduit means 35 and dispersed throughout condenser 27. Liquid solvent and water are withdrawn from condenser 27 via conduit means 28 and passed to a liquid phase separator 29. Uncondensible vapors are withdrawn from condenser 27 via conduit means 36 and passed to the liquid-vapor separator 38.

Within separator 29, the liquid solvent and water phases are permitted to separate into two immiscible phases. A liquid solvent phase is withdrawn from separator 29 via conduit means 30. A water phase is withdrawn from separator 29 via conduit 31. A portion of the water phase withdrawn from separator 29 is recycled via conduit means 32, cooled via heat exchange means 33 and passed via conduit means 35 in the heretofore-described manner to condenser 27. The remainder of the water phase withdrawn from separator 29 is passed via conduit means 31 to water sump 24. Water is withdrawn from water sump 24 and recycled via conduit means 14 through headers 11 and 13 in the heretofore previously described manner.

Vapors passed to relief headers 11 and 13 are withdrawn therefrom via conduit means 17 and passed through stripper 18 and condenser 27 to a liquid-vapor separator 38. Relief headers 11 and 13 are so sized as to permit the existence therein of both liquid and gaseous phases. Within separator 38, a liquid solvent phase is separated from the feed and withdrawn from separator 38 via conduit means 39. A vaporous stream comprising olefins is withdrawn from separator 38 via conduit means 40 and passed to a means 41 for compressing the olefin vapors, such as a conventional compressor. Compressed vapors are withdrawn from compression means 41 via conduit means 42 and passed to a means 43 for condensing the solvent contained in the compressed vapors.

The vapor-liquid mixture is passed from condensing means 43 via conduit means 44 to separator 46. Within separator 46, the liquid solvent is separated from the gaseous olefins and withdrawn therefrom via conduit means 47. Olefin vapors are withdrawn from separator 46 via conduit means 48.

A portion of the vapors withdrawn from separator 46 is recycled via conduit means 59 and valve means 60 to relief headers 11 and 13. The remainder of the vaporous stream withdrawn from separator 46 is passed via conduit means 48, conduit means 59 and conduit means 34 to an olefin recovery process not herein illustrated.

If the pressure within conduit means 37, as determined by conventional pressure-indicator-controller 51, falls below a predetermined value such as 0.5 p.s.i.g., controller 51 causes valve 50 to open so as to permit the recycle of at least a portion of the vaporous stream from separator 46 via conduit means 48, conduit means 49 and conduit means 40 to compression means 41. As illustrated, it is also within the scope of this invention to add olefin feed via conduit means 53 and valve means 54 to the vaporous feed to separator 38 if, for example, the pressure within conduit means 37 falls to 0.0 p.s.i.g. Operating in the described manner insures a pressure of at least atmospheric in the vapor recovery system.

Should the pressure within separator 46 exceed a maximum value such as 100 p.s.i.g., as indicated by conventional pressure-indicator-controller 56, controller 56 will cause valve means 58 to open, thereby passing the vapors directly from separator 46 via conduit means 48 and 57 to the flare as illustrated.

Recycle of vaporous stream via conduit means 59 to relief headers 11 and 13 is controlled by a conventional flow-recorder-controller 61 opening and closing valve means 60 to manipulate the rate of flow. The set point of flow-recorder-controller 61 is manipulated by a conventional pressure-indicator-controller 62 responsive to a pressure measurement within relief header 13. Pressure-indicator-controller 62 is operated so as to maintain a maximum pressure within relief header 13, reducing the flow rate of recycle vapor through conduit 59 to relief headers 11 and 13 when the pressure within relief headers 11 and 13 exceeds a desirable maximum such as 1.5 p.s.i.g.

Should the vapor pressure within relief headers 11 and 13 exceed a predetermined maximum as established by loop seal means 65, the vapors are withdrawn from relief headers 11 and 13 via conduit means 17, stripper vessel 18, conduit means 26, condenser 27, conduit means 36, conduit means 63, vapor-liquid separation vessel 66, conduit means 64, and loop seal means 65 to the flare. Therefore, the system is provided with a means for directly purging vapors to the flare should an upset condition occur in the polymerization reaction area or solvent removal process area, resulting in the transmittal of a vaporous surge to relief header 11 or 13.

I have thus provided a continuous solids, liquid and vapor recovery system wherein the feed to the system is intermittent and uncontrolled. By recyling a portion of the vapors withdrawn from separator 46 to relief headers 11 and 13, I have provided a system wherein the maximum pressure within the separation and recovery system will be at least atmospheric. In manipulating the rate of recycle of vapors to relief headers 11 and 13 via conduit means 59, I have further provided a method of controlling the flow of solvent to stripper 18 and separator 38. Upon increasing the rate of recycle of the vaporous stream, I can increase the vaporization of the liquid solvent within relief headers 11 and 13 and thus pass a greater proportion of the solvent via conduit means 37 to separator 38. Upon reducing the recycle of vapors via conduit means 59 to relief headers 11 and 13, the vaporization of liquid solvent within relief headers 11 and 13 is reduced, thereby increasing the flow of liquid solvent via conduit means 17 to stripper 18.

Although the liquid solvent recovered in the described specific embodiment is immiscible with the water, it is evident that the process could be employed to recover liquids miscible with water. Under these circumstances, a single liquid phase would be withdrawn from separator 29 and, if desired, the liquid phase can further be separated by well-known separation methods in a subsequent separation step or steps.

As will be evident to those skilled in the art, various modifications of this invention can be made, or followed, in the light of the foregoing disclosure and discussion, without departing from the spirit or scope thereof.

I claim:

1. A solids, liquid and vapor recovery system which comprises passing solids to a contact zone, passing a liquid to said contact zone, passing a vapor to said contact zone, passing a mixture comprising said solids, said liquid and said vapor from said contact zone to a first separation zone, withdrawing solids from said first separation zone, passing a vaporous mixture containing said vapor and said liquid from said first separation zone to a second separation zone, withdrawing said liquid from said second separation zone, passing said vapor from said second separation zone to a third separation zone, and recycling at least a portion of said vapor from said third separation zone to said contact zone.

2. A solids, liquid and vapor recovery process which comprises passing solids to a contact zone, passing a first liquid to said contact zone, passing a second liquid to said contact zone, passing a vapor to said contact zone, passing a mixture comprising said solids, said first liquid, said second liquid and said vapor from said contact zone to a first separation zone, withdrawing solids from said first separation zone, passing a vaporous mixture containing said first liquid, said second liquid and said vapor from said first separation zone to a second separation zone, withdrawing said first liquid and said second liquid from said second separation zone, passing a vapor from said second separation zone to a third separation zone, withdrawing a vapor from said third separation zone, and recycling at least a portion of said vapor withdrawn from said third separation zone to said contact zone.

3. The process of claim 2 to include passing vapors from said second separation zone to a flare when the pressure of said vapor passed from said second separation zone to said third separation zone exceeds a predetermined value.

4. A solids, liquid and vapor recovery process which comprises passing solids to a contact zone, passing a first liquid to said contact zone, passing a vapor to said contact zone, passing a second liquid immiscible with said first liquid to said contact zone, passing a mixture comprising said solids, said first liquid, said second liquid and said vapor from said contact zone to a first separation zone, withdrawing said solids from said first separation zone, passing a vaporous mixture containing said first liquid, said second liquid and said vapor from said first separation zone to a second separation zone, withdrawing said first liquid and said second liquid from said second separation zone, passing a vapor from said second separation zone to a third separation zone, withdrawing a liquid from said third separation zone, passing a vapor from said third separation zone to a means for compressing said vapor, passing a vapor from said means for compressing to a means for at least partially condensing said compressed vapor, passing a fluid mixture from said means for condensing to a fourth separation zone, withdrawing a liquid from said fourth separation zone, withdrawing a vapor from said fourth separation zone, and recycling at least a portion of said vapor from said fourth separation zone to said contact zone.

5. The process of claim 4 to include measuring a property of said vapor passed from said second separation zone to said third preparation zone representative of the pressure thereof, and manipulating the recycle of vapor from said fourth separation zone to said means for compressing responsive thereto.

6. The process of claim 4 to include measuring a property within said contact zone representative of the vapor pressure within said contact zone and manipulating the recycle of vapor from said fourth separation zone to said contact zone responsive thereto.

7. The process of claim 4 to include measuring property within said fourth separation zone representative of the pressure within said fourth separation zone, and manipulating the flow of vapor from said fourth separation zone to a flare responsive thereto.

8. A solids, liquid and vapor recovery process which comprises passing solids to a contact zone, passing a first liquid having a greater volatility than steam to said contact zone, passing a vapor to said contact zone, passing water to said contact zone, passing a mixture comprising said solids, said first liquid, said water and said vapor from said contact zone to a first separation zone, passing steam to said first separation zone and therein contacting said mixture, withdrawing said solids from said first separation zone, passing a vaporous mixture comprising said vapor, said first liquid and water from said first separation zone to a condensing zone, withdrawing a liquid mixture comprising said first liquid and water from said condensing zone, passing a vapor from said condensing zone to a second separation zone, withdrawing a liquid from said second separation zone, withdrawing a vapor from said second separation zone, and recycling at least a portion of said vapor withdrawn from said second separation zone to said contact zone.

9. The process of claim 8 to include passing said liquid withdrawn from said condensing zone to a liquid phase separation zone, withdrawing said first liquid from said liquid phase separation zone, withdrawing water from said liquid phase separation zone, and recycling said water withdrawn from said liquid phase separation zone to said contact zone.

10. A solids, liquid and vapor recovery process which comprises passing solids to a contact zone, passing water to said contact zone, passing a vapor to said contact zone, passing a liquid immiscible with said water to said contact zone, passing a mixture comprising said solids, said liquid, said vapor and said water from said contact zone to a first separation zone, passing steam to said first separation zone and therein contacting said mixture, withdrawing said solids from said first separation zone, passing a vaporous mixture comprising said vapor, said liquid and water from said first separation zone to a condensing zone, withdrawing a liquid mixture comprising water and said liquid from said condensing zone, passing said liquid mixture withdrawn from said condensing zone to a liquid phase separation zone, withdrawing water from said liquid phase separation zone, withdrawing said liquid from said liquid phase separation zone, passing a vapor from said condensing zone to a second separation zone, withdrawing a liquid from said second separation zone, passing a vapor from said second separation zone to a means for compressing said vapor, passing a vapor from said means for compressing to a means for at least partially condensing said compressed vapor, passing a fluid mixture from said means for condensing to a third separation zone, withdrawing a liquid from said third separation zone withdrawing vapor from said third separation zone, and recycling at least a portion of said vapor withdrawn from said third separation zone to said contact zone.

11. The process of claim 10 wherein said solids comprise polymer particles, said liquid passed to said contact zone comprises a hydrocarbon solvent, and said vapor passed to said contact zone comprises olefins.

12. Apparatus comprising a header, a first separation vessel, first conduit means communicating between said header and said first separation vessel, means for withdrawing solids from said first separation vessel, second conduit means in communication with the lower region of said first separation vessel, a condenser, third conduit means communicating between said first separation vessel and said condenser, fourth conduit means communicating with said condenser, a second separation vessel, fifth conduit means communicating between said condenser and said second separation vessel, means for compressing a vapor, sixth conduit means communicating between said second separation vessel and said means for compressing, seventh conduit outlet means communicating with said second separation vessel, second means for condensing, eighth conduit means communicating between said means for compressing and said second means for condensing, a third separation vessel, ninth conduit means communicating between said second means for condensing and said third separation vessel, tenth conduit means communicating with said third separation vessel, eleventh conduit means communicating between said third separation vessel and said header, and multiple conduit inlet means communicating with said header.

13. The apparatus of claim 12 to include a vapor-liquid separation vessel, twelfth conduit means communicating between said fifth conduit means and said vapor-liquid separation vessel, a flare conduit means, thirteenth conduit means communicating between said vapor-liquid separation vessel and said flare conduit means, and means for controlling the flow of vapors through said twelfth and thirteenth conduit means to said flare conduit means.

14. The apparatus of claim 13 to include means for measuring a pressure within said header, and means for manipulating the rate of fluid flow through said eleventh conduit means responsive to said measurement.

15. The apparatus of claim 14 to include fourteenth conduit means communicating between said third separation vessel and said flare conduit means, and means for manipulating the rate of fluid flow through said fourteenth conduit means responsive to a pressure measurement within said third separation vessel.

16. The apparatus of claim 15 to include fifteenth conduit means communicating between said third separation vessel and said means for compressing, and means for manipulating the rate of fluid flow through said fifteenth conduit means responsive to a measurement representative of the presure within said sixth conduit means.

17. The apparatus of claim 16 to include a fourth separation vessel, said fourth conduit means in communication with said fourth separation vessel, sixteenth conduit means in communication with the bottom of said fourth separation vessel, and seventeenth conduit means in communication with an intermediate region of said fourth separation vessel.

References Cited by the Examiner

UNITED STATES PATENTS

| 2,792,070 | 5/57 | Strunk | 55—89 X |
| 2,876,865 | 3/59 | Cobb | 55—85 X |
| 2,978,063 | 4/61 | Ford et al. | 55—23 X |
| 3,097,215 | 7/63 | Courter et al. | 55—23 X |

FOREIGN PATENTS 222,541  7/59  Australia.

REUBEN FRIEDMAN, *Primary Examiner.*